(12) United States Patent
Oh et al.

(10) Patent No.: US 8,123,977 B2
(45) Date of Patent: Feb. 28, 2012

(54) COPOLYMER FOR LIQUID CRYSTAL ALIGNMENT, LIQUID CRYSTAL ALIGNING LAYER INCLUDING COPOLYMER FOR LIQUID CRYSTAL ALIGNMENT, AND LIQUID CRYSTAL DISPLAY INCLUDING LIQUID CRYSTAL ALIGNING LAYER

(75) Inventors: Dong Hyun Oh, Seoul (KR); Kyung Jun Kim, Daejeon Metropolitan (KR); Jung Ho Jo, Anyang-si (KR); Hye Ran Seong, Seoul (KR); Sang Kook Kim, Goyang-si (KR); Byung Hyun Lee, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 856 days.

(21) Appl. No.: 11/593,050

(22) Filed: Nov. 6, 2006

(65) Prior Publication Data

US 2007/0102668 A1 May 10, 2007

(30) Foreign Application Priority Data

Nov. 7, 2005 (KR) ........................ 10-2005-0106191

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.01; 252/299.6; 252/299.61; 252/299.62; 252/299.63; 252/299.64; 252/299.65; 252/299.66; 252/299.67; 430/20; 428/1.1; 428/1.3; 349/117

(58) Field of Classification Search ............. 252/299.01, 252/299.6–67; 428/1.1; 430/20, 270.1; 349/117
See application file for complete search history.

(56) References Cited

U.S. PATENT DOCUMENTS

| | | | |
|---|---|---|---|
| 6,201,087 B1 | 3/2001 | Herr et al. | |
| 6,368,681 B1 | 4/2002 | Ogawa | |
| 6,696,114 B1 | 2/2004 | Kawatsuki et al. | |
| 7,502,088 B2 * | 3/2009 | Suzuki et al. | 349/141 |
| 2004/0140451 A1 | 7/2004 | Meyer et al. | |

FOREIGN PATENT DOCUMENTS

| | | |
|---|---|---|
| CN | 1500780 | 6/2004 |
| JP | 08-328005 | 12/1996 |
| JP | 10-026760 | 1/1998 |
| JP | 11-181127 | 7/1999 |
| JP | 2004-302272 | 10/2004 |
| JP | 2005-002164 | 1/2005 |
| WO | PCT/CH95/00209 | 9/1995 |
| WO | PCT/JP97/02354 | 7/1997 |

* cited by examiner

*Primary Examiner* — Geraldina Visconti
(74) *Attorney, Agent, or Firm* — McKenna Long & Aldridge LLP

(57) ABSTRACT

Disclosed is a copolymer for liquid crystal alignment having a photoreactive group, a mesogen group, a thermosetting group, and a crosslinking group, a liquid crystal aligning layer including the copolymer for liquid crystal alignment, and a liquid crystal display including the liquid crystal aligning layer. Since the liquid crystal aligning layer has excellent thermal stability and no residual image, the liquid crystal aligning layer is usefully applied to the liquid crystal display.

9 Claims, 2 Drawing Sheets

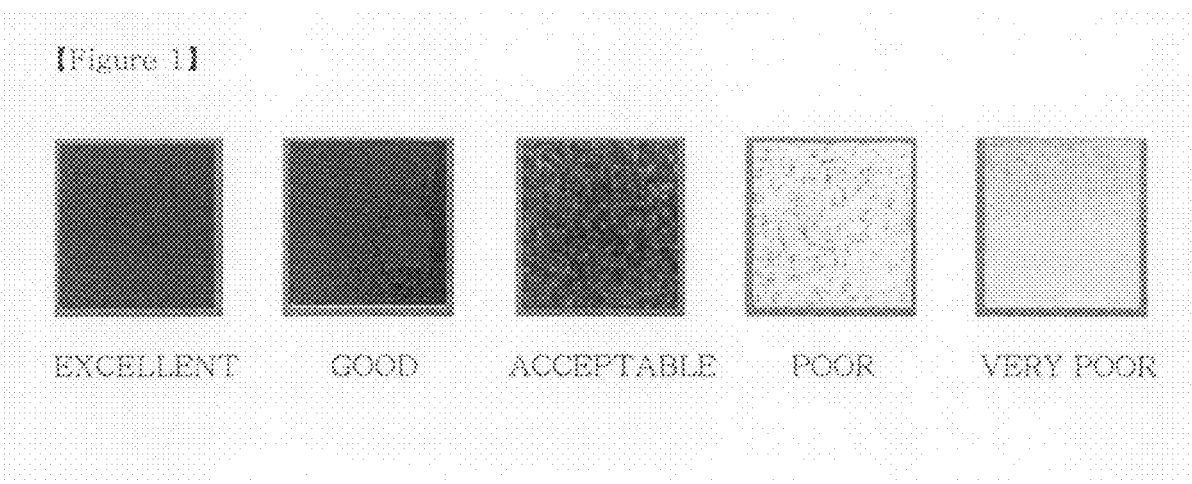
[Figure 1]
EXCELLENT    GOOD    ACCEPTABLE    POOR    VERY POOR

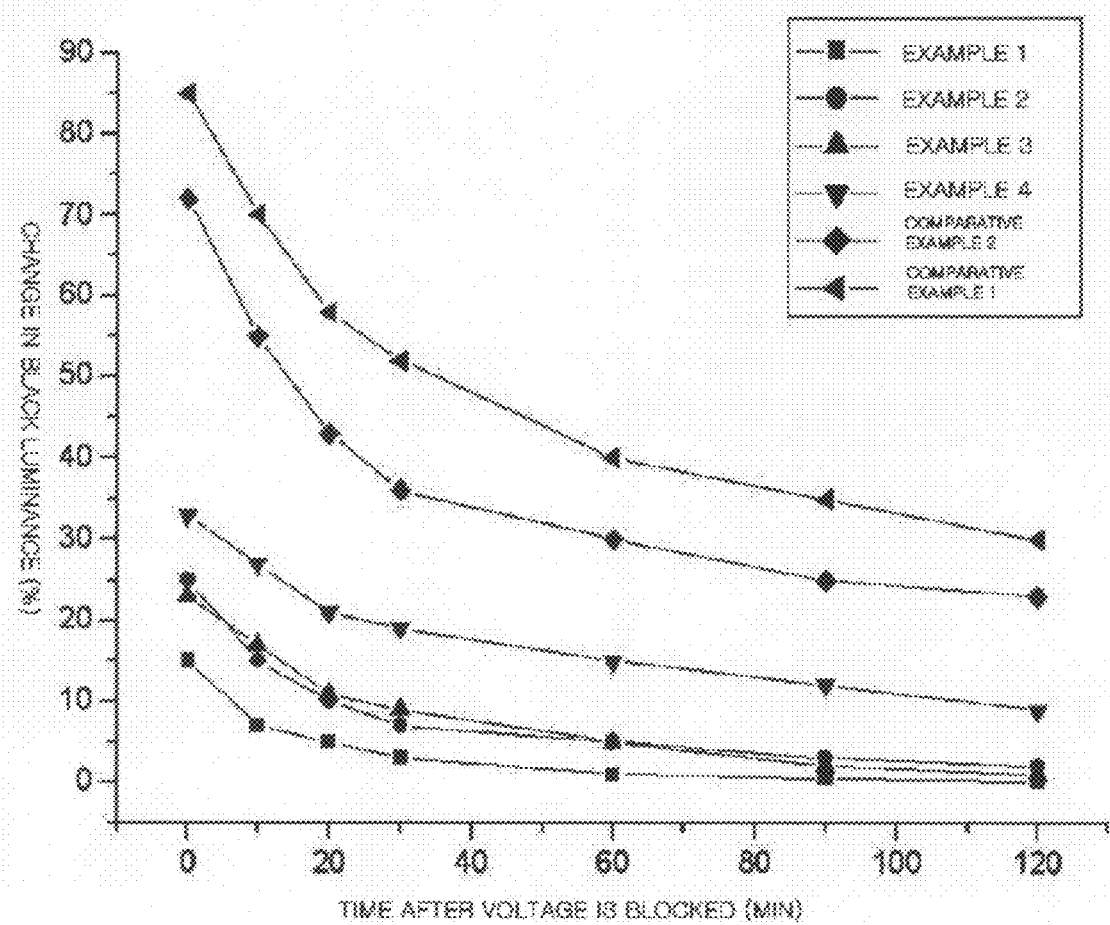

COPOLYMER FOR LIQUID CRYSTAL ALIGNMENT, LIQUID CRYSTAL ALIGNING LAYER INCLUDING COPOLYMER FOR LIQUID CRYSTAL ALIGNMENT, AND LIQUID CRYSTAL DISPLAY INCLUDING LIQUID CRYSTAL ALIGNING LAYER

This application claims the benefit of Korean Patent Application No. 10-2005-0106191, filed on Nov. 7, 2005, which is hereby incorporated by reference for all purposes as if fully set forth herein.

TECHNICAL FIELD

The present invention relates to a copolymer for liquid crystal alignment, a liquid crystal aligning layer including the copolymer for liquid crystal alignment, and a liquid crystal display including the liquid crystal aligning layer.

The present application claims the benefit of Korean Patent Application No. 2005-0106191 (filed on Nov. 7, 2005), which is incorporated herein by its entirety for reference.

BACKGROUND ART

In accordance with the advance in the display industry, a low driving voltage, high resolution, reduction in volume of the monitor, and flatness of the monitor are realized in a liquid crystal display field. Accordingly, demands for liquid crystal displays are significantly growing. In liquid crystal display technologies, it is essential to align liquid crystals in a desired direction.

In the related art, a contact-type rubbing process is used as a known process of aligning liquid crystals. The process includes applying a polymer film formed of a polymer such as polyimide on a substrate such as glass, and rubbing a surface of the resulting substrate using fibers such as nylon or polyester in a predetermined direction. However, in the contact-type rubbing process, fine dust may be generated or electrostatic discharge (ESD) may occur when the fibroid materials are rubbed with the polymer film and problems may occur during the production of liquid crystal panels due to the trouble of the process.

Recently, many studies have been made to produce an aligning layer using a novel contactless-type process in order to avoid the above problems of the contact-type rubbing process. Examples of the contactless-type process of producing the aligning layer include a photo alignment process, an energy beam alignment process, a vapor deposition alignment process, and an etching process using lithography. However, the contactless-type aligning layer is difficult to be commercialized due to low thermal stability and residual images as compared to the aligning layer produced using the contact-type rubbing. Particularly, in the case of the photoaligning layer, since thermal stability is significantly reduced and the residual images are maintained for a long time, the photo-aligning layer cannot be commercially produced even though convenience of the process is assured.

With respect to improvement in thermal stability, Korean Patent No. 10-0357841 discloses novel linear and cyclic polymers or oligomers of coumarin and quinolinol derivatives having the photoreactive ethen group, and the use of the polymers or the oligomers as the liquid crystal aligning layer. However, the patent is problematic in that residual images are very easily formed due to a rod-shaped mesogen bonded to a main chain.

To avoid the above-mentioned problem regarding the residual images, Korean Patent No. 10-0258847 suggests a liquid crystal aligning layer that is mixed with a thermosetting resin or has a functional group capable of being thermally cured. However, the patent is problematic in that alignment and thermal stability are poor.

DISCLOSURE

Technical Problem

The present inventors have conducted studies into a liquid crystal aligning layer having excellent thermal stability and no residual image, resulting in the finding that a liquid crystal aligning layer which includes a synthesized copolymer for liquid crystal alignment having a photoreactive group, a mesogen group, a thermosetting group, and a crosslinking group has excellent thermal stability and has not residual images, thereby accomplishing the present invention.

An object of the present invention is to provide a copolymer for liquid crystal alignment including a photoreactive group, a mesogen group, a thermosetting group, and a crosslinking group.

Another object of the present invention is to provide a liquid crystal aligning layer including the copolymer for liquid crystal alignment.

Still another object of the present invention is to provide a liquid crystal display including the liquid crystal aligning layer.

Technical Solution

The present invention provides a copolymer for liquid crystal alignment shown in Formula 1.

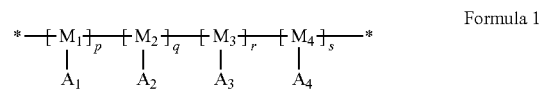

Formula 1

In Formula 1, $M_1$ to $M_4$ are respectively independent repeating units in a polymer chain, and selected from the group consisting of an acryl group, a methacryl group, a croton group, a maleic group, a maleamic group, a citracon group, an itacon group, a styrene group, a methyl styrene group, an acrylamide group, a methacrylamide group, and a maleic imide group, p, q, r, and s are molar ratios of the repeating units, p+q+r+s are 1, p is 0.1 to 0.9, q is 0.1 to 0.9, r is 0 to 0.3, and s is 0 to 0.3, $A_1$ is a photoreactive group in which $A_3$ or $A_4$ is substituted or unsubstituted, $A_2$ is a mesogen group in which $A_3$ or $A_4$ is substituted or unsubstituted, $A_3$ is a thermosetting group, and $A_4$ is a crosslinking group that causes a thermal curing reaction of $A_3$ and crosslinking.

$A_1$ is the photoreactive group in which $A_3$ is substituted, or $A_2$ is the mesogen group in which $A_3$ is substituted with the proviso that r is 0, and $A_1$ is the photoreactive group in which $A_4$ is substituted, or $A_2$ is the mesogen group in which $A_4$ is substituted with the proviso that s is 0.

$A_1$ contains any one selected from the group consisting of the following structural formulae.

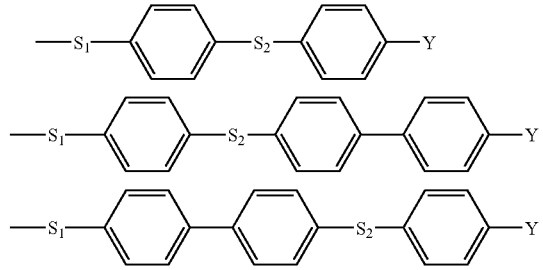

In the structural formulae, $S_1$ is a spacer and a divalent functional group that is —O—; —NH—; or $C_1$ to $C_6$ alkyl chains containing functional groups that are identical or different and are selected from the group consisting of an ether group, an amine group, an ester group, and an amide group at both ends of said chains. Specific examples of $S_1$ includes —NH—$(CH_2)_n$—NH—, —O—$(CH_2)_n$—O—, —NH—$(CH_2)_n$—O—, —O—$(CH_2)_n$—NH—, —O—$(CH_2)_n$—OCO—, or —O—$(CH_2)_n$—NHCO—, and n is 1 to 6.

$S_2$ is a group having an enone structure that is capable of being photodimerized and isomerized, and is —NH—CO—(CH=CH)—, —O—CO—(CH=CH)—, —(CH=CH)—CO—NH—, —(CH=CH)—CO—O—, —CO—(CH=CH)—, or —(CH=CH)—CO—.

Y is a ligand substituted at the end, and selected from the group consisting of a hydrogen, a hydroxy group, a $C_1$ to $C_{10}$ alkyloxy group, a halogen, an amine group, a nitrile group, a nitro group, a glycidyl group, an isocyanate group, a tetrahydropyranyl carboxylic acid group, and an acetic anhydride group.

Specific examples of a monomer for the $M_1$-$A_1$ repeating unit include, but are not limited to the structural formula selected from the group consisting of the following structural formulae.

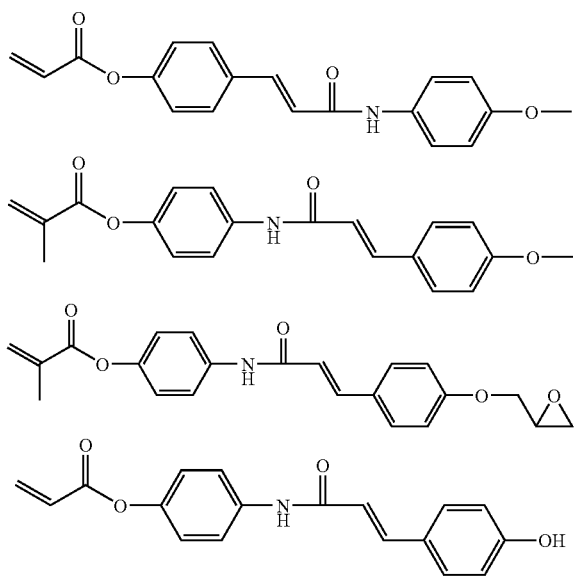

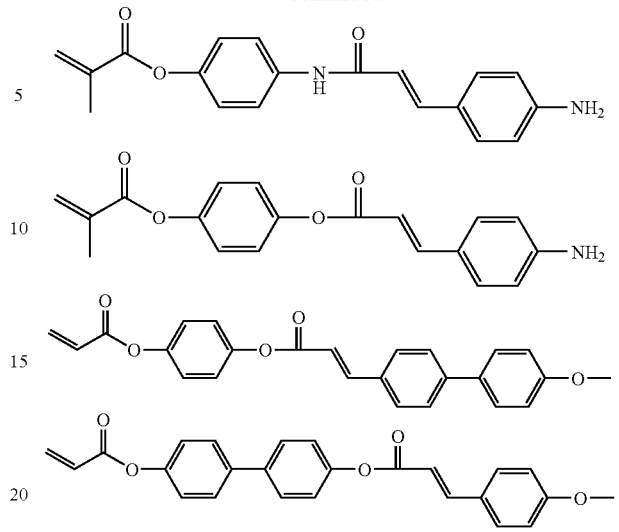

$A_2$ contains any one selected from the group consisting of the following structural formulae.

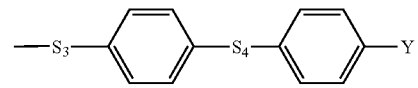

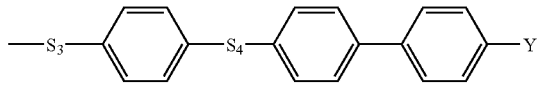

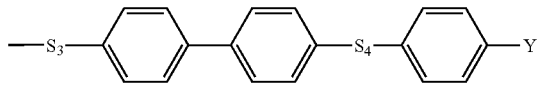

In the structural formulae, $S_3$ is a spacer, and a divalent functional group that is —O—; —NH—; or $C_1$ to $C_6$ alkyl chains containing functional groups that are identical or different and are selected from the group consisting of an ether group, an amine group, an ester group, and an amide group at both ends of said chains. Specific examples of $S_3$ include —NH—$(CH_2)_n$—NH—, —O—$(CH_2)_n$—O—, —NH—$(CH_2)_n$—O—, —O—$(CH_2)_n$—NH—, —O—$(CH_2)_n$—OCO—, or —O—$(CH_2)_n$—NHCO—, and n is 1 to 12.

$S_4$ is a spacer, which is —CO—O— or —O—CO—.

Y is a ligand substituted at the end, and selected from the group consisting of a hydrogen, a hydroxy group, a $C_1$ to $C_{10}$ alkyloxy group, a halogen, an amine group, a nitrile group, a nitro group, a glycidyl group, an isocyanate group, a tetrahydropyranyl carboxylic acid group, and an acetic anhydride group.

Specific examples of $A_2$ include a mesogen having various types of rod-shaped liquid crystal structures. Preferably, $A_2$ includes phenyl and biphenyl structures connected to ester.

Specific examples of a monomer for the $M_2$-$A_2$ repeating unit include, but are not limited to the structural formula selected from the group consisting of the following structural formulae.

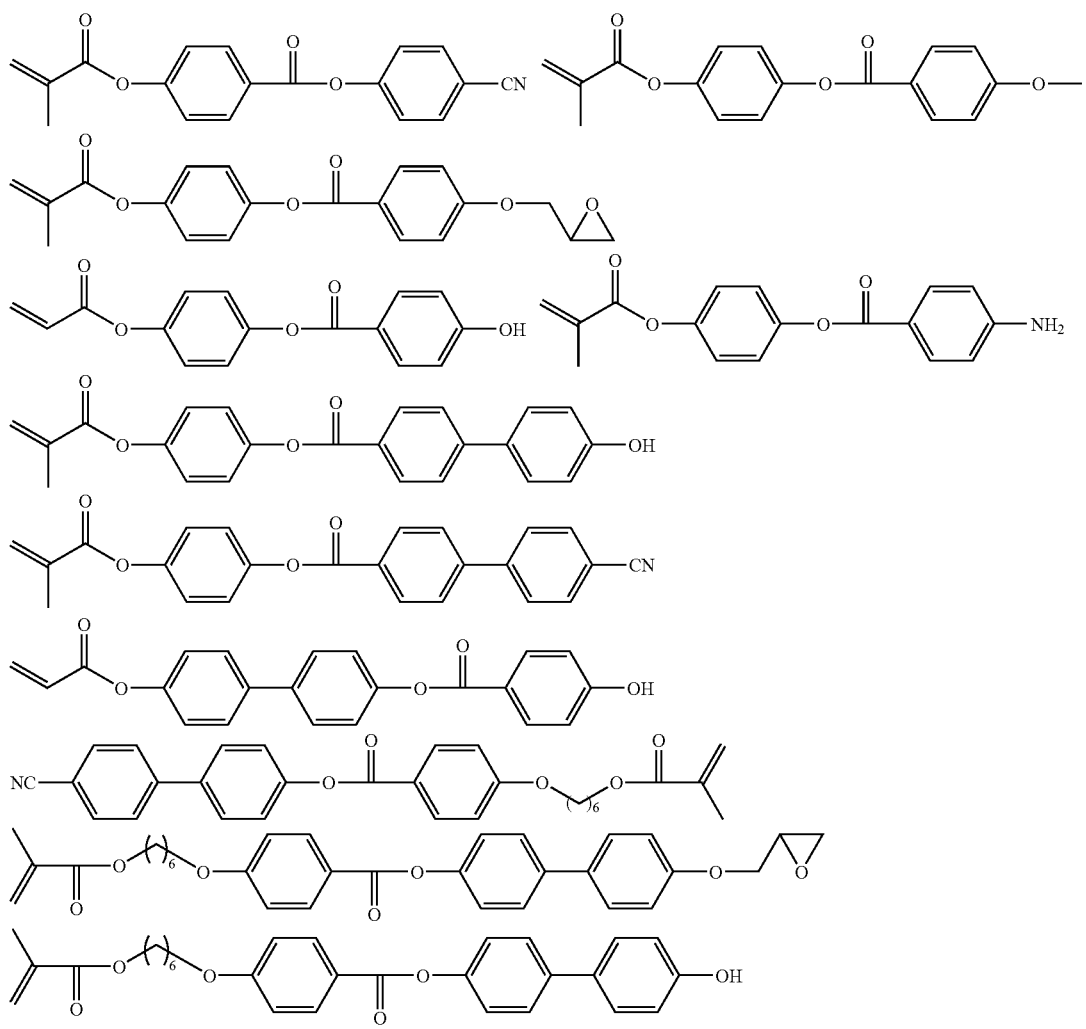

$A_3$ is represented by the following structural formula.

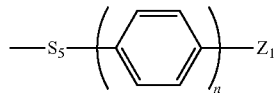

In the structural formula, $S_5$ is a spacer, and a divalent functional group that is —O—, or $C_1$ to $C_{10}$ alkyl chains containing an ether group or a —OCO—NH— group at both ends of said chains, and n is 0 or 1.

$Z_1$ is a group which causes thermal curing and is selected from the group consisting of an epoxy group, an oxetane group, an isocyanate group, an isothiocyanate group, a hydroxy group, and an amine group.

Specific examples of a monomer for the $M_3$-$A_3$ repeating unit include, but are not limited to the structural formula selected from the group consisting of the following structural formulae.

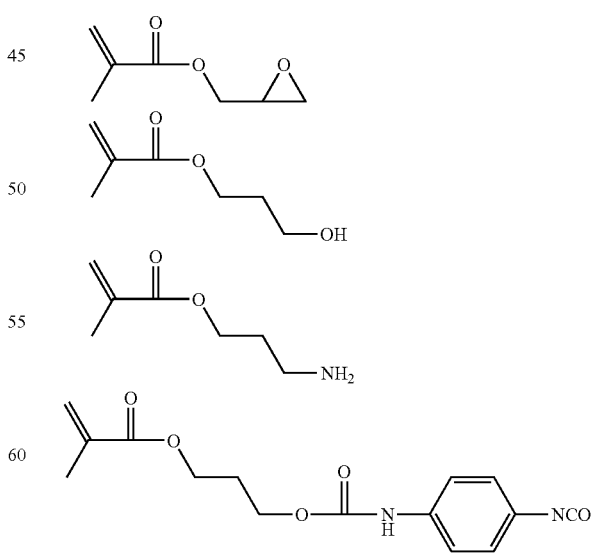

$A_4$ is represented by the following structural formula.

—$S_6$—$Z_2$

In the structural formula, $S_6$ is a spacer, and a divalent functional group that is —O—, or $C_1$ to $C_4$ alkyl chains containing an ether group at both ends of said chains.

$Z_2$ is a functional group which causes crosslinking and is selected from the group consisting of a carboxylic acid group, a tetrahydropyran group, an acid anhydride group, and an imidazole group.

Specific examples of a monomer for the $M_4$-$A_4$ repeating unit include, but are not limited to the structural formula selected from the group consisting of the following structural formulae.

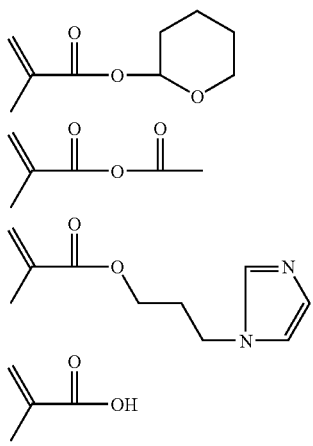

Advantageous Effects

Since a copolymer for liquid crystal alignment of the present invention contains a photoreactive group, a mesogen group, a thermosetting group, and a crosslinking group, a liquid crystal aligning layer that contains the copolymer for liquid crystal alignment has excellent thermal stability and no residual image. Therefore, the liquid crystal aligning layer according to the present invention may be usefully applied to a liquid crystal display.

DESCRIPTION OF DRAWINGS

FIG. 1 illustrates an evaluation standard of alignment of a liquid crystal cell; and FIG. 2 illustrates evaluation of a residual image of a liquid crystal cell according to the present invention.

BEST MODE

A copolymer shown in Formula 1 may be produced while a molecular weight and a composition ratio are controlled depending on the purpose. Specific examples of the copolymer are as follows.

The copolymer shown in Formula 1 may be produced using radical copolymerization or radiation of ultraviolet rays. Preferably, the production may be performed using the radical copolymerization.

Two to four different repeating units that has a double bond capable of performing polymerization and $A_1$ to $A_4$ ligands, such as methacrylate, acrylate, styrene, methyl styrene, and maleic imide, and a radical initiator are dissolved in a suitable solvent, and then agitated in a nitrogen atmosphere to perform the radical copolymerization.

In connection with this, a diazo-based initiator that is sold by Wako Co., Ltd. and is capable of being decomposed by heating may be used as the radical initiator, or ultraviolet rays may be used. Preferably, 2,2'-azobis(2,4-dimethylvaleronitrile) (V65) or azo-bis-isobutyronitrile (AIBN) is used. The solvent that is capable of desirably dissolving the monomer is used. In detail, the solvent is selected from the group consisting of DMF (dimethylformamide), DMAc (N,N-dimethylacetamide), toluene, benzene, THF (tetrahydrofuran), and $CCl_4$. Preferably, DMF is used.

The polymerization temperature is 30 to 100° C., and preferably 50 to 70° C.

With respect to the concentration of the repeating unit, the total weight of the two to four repeating units is 5 to 50 weight ratio, and preferably 10 to 25 weight ratio, based on the weight of the solvent according to the purpose.

The solution after the reaction is finished is dropped in an alcohol solvent such as methanol or ethanol to obtain precipitates.

Agitation is performed for the reaction time of 2 to 15 hours, and preferably 4 to 8 hours.

With respect to the composition ratio of the four repeating units of $M_1$ to $M_4$, as shown in Formula 1, $p+q+r+s=1$, $p=0.1$ to 0.9, $q=0.1$ to 0.9, $r=0$ to 0.3, and $s=0$ to 0.3, and preferably $p=0.3$ to 0.6, $q=0.3$ to 0.6, $r=0$ to 0.2, and $s=0$ to 0.1. In the present invention, in the case of when substituent groups Y of ends of $A_1$ and $A_2$ in Formula 1 are selected from acceptors of a nuclear substitution reaction for heat crosslinking, such as glycidyl and isocyanate groups, since the functional group capable of performing heat crosslinking bonding is used, a copolymer of three monomers where r is 0 and $A_3$ is not present is provided in Formula 1. Additionally, in the case of when Y is supplied from donors of a nuclear substitution reaction for heat crosslinking, such as hydroxy, amine, and tetrahydropyranyl carboxylic acid groups, in Formula 1, a copolymer of three monomers where s is 0 and $A_4$ is not present is provided in Formula 1. Therefore, in the case of when substituent end groups Y of $A_1$ and $A_2$ are selected from glycidyl and hydroxy groups, glycidyl and amine groups, or glycidyl and tetrahydropyranyl carboxylic acid groups, a copolymer including two monomers where r and s are both 0 is provided.

Furthermore, the present invention provides a liquid crystal aligning layer including the copolymer for liquid crystal alignment of Formula 1.

The liquid crystal aligning layer according to the present invention may be directly produced using a known method. Alternatively, in the case of when s is 0 in Formula 1, a crosslinking agent may be further added to produce the layer. The crosslinking agent functions to fix the network of the polymer during the heat treatment to prevent the residual image from being formed. Examples of the crosslinking agent may include amines, acid anhydrides, mercaptans, and isocyanates. It is preferable to use amines or acid anhydrides. The crosslinking agent is contained in an amount of 0.01 to 30 parts by weight, and preferably 0.01 to 3 parts by weight, based on 100 parts by weight of the polymer. Examples of the crosslinking agent include amines such as diethylenetriamine, triethylenetetramine, diethylenetriaminetriethylenetetramine, diethylaminopropylamine, mantanediamine, N-aminoethylpiperazine, benzyldimethylamine, M-xylenediamine, isophoronediamine, metaphenylenediamine, dimethylaniline, diaminophenylmethane, diaminodiphenylsulfone, and dicyandiamide; and acid anhydrides such as bisaminopropyl tetraoxaspiroundecane anhydride, phthalic anhydride, maleic anhydride, dodecyl succinic anhydride, hexahydrophthalic anhydride, methylnadic anhydride, pyromellitic anhydride, benzophenontetracarbonic anhydride, dichlorosuccinic anhydride, chlorendic anhydride, and methyltetrahydrophthalic anhydride. In the case of the acid anhydride-based crosslinking agent, imidazoles such as 2-phenylimidazole, 2-methylimidazole, and 2-ethylimidazole may be used as a catalyst. In connection with this, the content of the catalyst is 0.01 to 5 parts by weight based on 100 parts by weight of the crosslinking agent.

To produce the liquid crystal aligning layer according to the present invention, a typical solvent or additive may be used in addition to the copolymer for liquid crystal alignment.

Examples of the additive include, but are not limited to various types of epoxy resin, polyvalent isocyanate, carboxylic acid, amine, and alcohol which are extensively used in the thermosetting resin. The above-mentioned examples of the additive are used as the additive of the copolymer of Formula 1. The addition molar ratio is 0.01 to 100% based on the monomer having end functional groups of epoxy, isocyanate, and isothiocyanate groups corresponding to ends of Formula 1. Practically, the weight ratio is 0.01 to 50% based on the copolymer of Formula 1.

A method of producing the liquid crystal aligning layer according to the present invention includes dissolving the copolymer for liquid crystal alignment of Formula 1 in a solvent to produce a liquid crystal alignment solution, and applying the liquid crystal alignment solution on a glass substrate on which indium tin oxide (ITO) is applied using a process such as spin coating, roll coating, or inkjet coating.

The concentration of the liquid crystal alignment solution, the type of solvent, and the application process depend on the type and the purpose of the substance. Examples of the usable solvent include, but are not limited to cyclopentanone, cyclohexanone, N-methylpyrolidone, DMF, THF, CCl$_4$, or a mixture thereof. The copolymer for liquid crystal alignment is dissolved in a weight ratio of 1 to 30 based on the solvent, passed through a filter having a hole size of 0.2 to 1 μm to remove residual floating materials, applied on the glass substrate on which the indium tin oxide is applied using spin coating, roll coating, or inkjet coating, and heated at 60 to 150° C. for 1 to 10 min to vaporize the solvent. The thickness of the applied aligning layer is 80 to 3,000 Å, and preferably 500 to 1,500 Å. The glass substrate on which the aligning layer is formed and the indium tin oxide is applied is subjected to two processes including exposing using polarized ultraviolet rays and heat treatment. The selectively polarized ultraviolet rays are radiated on a region where alignment is performed. The ultraviolet rays may be radiated using a high pressure mercury lamp, a xenone lamp, or pulse ultraviolet rays. In connection with this, the exposure intensity depends on the type of copolymer for liquid crystal alignment. Energy of 50 mJ/cm$^2$ to 10 cm$^2$, and preferably 200 mJ/cm$^2$ to 5 J/cm$^2$, is radiated. The exposed substrate is subjected to a heat treatment process. In the present invention, the heat treatment may be performed after the exposing to maximize the alignment. The heat treatment is performed at 100 to 250° C. for 10 min to 1 hour. After the heat treatment is finished, the two substrates are attached using an adhesive and spacers to form a single cell. Additionally, the liquid crystal is injected into the liquid crystal cell. Various types of liquid crystals may be used to form the liquid crystal cell including the aligning layer according to the present invention. However, in the embodiment of the present invention, only liquid crystals for TN and IPS liquid crystals are disclosed. After the liquid crystals are sealed, the heat treatment is performed at 150° C. for 10 min to align the liquid crystals in an arrangement direction of the aligning layer.

Additionally, the present invention provides a liquid crystal display including the liquid crystal aligning layer.

The liquid crystal display may be produced according to a typical method known in the art.

The liquid crystal display including the liquid crystal aligning layer that is produced using the copolymer for liquid crystal alignment according to the present invention is advantageous in that thermal stability is excellent and there is no residual image.

[Mode for Invention]

A better understanding of the present invention may be obtained in light of the following Examples and Comparative Examples which are set forth to illustrate, but are not to be construed to limit the present invention.

Preparative Example 1

Preparation of Monomer 1

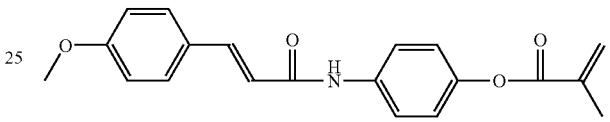

1.1 g of 4-Methoxycinnamic acid chloride was dissolved in 10 mL of THF, and then 2.3 g of 4-aminophenol was added to the solution. The mixture was stirred at normal temperature for 5 hours, filtered to remove precipitates, and then distilled under reduced pressure. Then, 20 mL of 1 N hydrochloric acid was added to the mixture, and the resulting precipitate was collected with a filter, and the filtrate was washed with a large amount of water to obtain 1.4 g of a target compound. This target compound was dried, and dissolved in 10 mL of THF, and then 0.5 mL of methacrylic acid chloride was slowly added to the solution at 0° C. Then, the mixture was slowly warmed to normal temperature, and stirred for 3 hours. The precipitate was filtered off, and the precipitate was collected on the filter by addition of hexane, and then dried to obtain 1.4 g of a monomer 1, [2-methacrylic acid-4-(3-(4-methoxy-phenyl)-acryloylamino)-phenylester].

In the similar manner to the above-described process, the following monomers can be prepared:

1) 2-methacrylic acid-4-(3-(4-cyano-phenyl)-acryloylamino)-phenylester,
2) 2-methacrylic acid-4-(3-(4-butyloxy-phenyl)-acryloylamino)-phenylester,
3) acrylic acid-4-(3-(4-cyano-phenyl)-acryloylamino)-phenylester,
4) acrylic acid-4-(3-(4-methoxy-phenyl)-acryloylamino)-phenylester,
5) acrylic acid-4-(3-(4-butyloxy-phenyl)-acryloylamino)-phenylester,
6) 3-(4-methoxy-phenyl)-acrylic acid 4-(2-methyl-acryloylamino)-phenylester,
7) 3-(4-cyano-phenyl)-acrylic acid 4-(2-methyl-acryloylamino)-phenylester,
8) 3-(4-butyloxy-phenyl)-acrylic acid 4-(2-methyl-acryloylamino)-phenylester, and
9) 3-(4-methoxy-phenyl)-acrylic acid 4-acryloylamino-phenylester.

Preparative Example 2

Preparation of Monomer 2

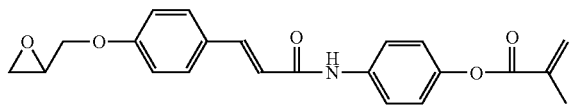

1.1 g of 4-Allyloxybenzoic acid chloride was dissolved in 10 mL of THF, and then 2.3 g of 4-aminophenol was added to the solution. The mixture was stirred at normal temperature for 5 hours, filtered to remove precipitates, and then distilled under reduced pressure. Then, 20 mL of 1 N hydrochloric acid was added to the mixture, and the resulting precipitate was collected with a filter, and the filtrate was washed with a large amount of water to obtain 1.4 g of a target compound. This target compound was dried, and dissolved in 10 mL of THF, and then 0.5 mL of methacrylic acid chloride was slowly added to the solution at 0° C. Then, the mixture was slowly warmed to normal temperature, and stirred for 3 hours. The precipitate was filtered off, and the precipitate was collected on the filter by addition of hexane, dried, and dissolved in 10 mL of THF, and then 1.2 g of 4-chloroperoxybenzoic acid (MCPBA) was added to the solution. The mixture was stirred at normal temperature for 12 hours. After reaction, 100 mL of distilled water was added to the mixture, and the resulting precipitate was collected with a filter, and then dried to obtain 1.3 g of a monomer 2 [2-methyl-acrylic acid 4-[3-(4-oxiranylmethoxy-phenyl)-acryloylamino]-phenylester].

In the similar manner to the above-described process, the following monomers can be prepared:
1) acrylic acid-4-(4-cyano-benzoylamino)-phenylester,
2) 3-(4-oxiranylmethoxy-phenyl)-acrylic acid 4-(2-methyl-acryloylamino)-phenylester, and
3) 2-methyl-N-4-[3-(4-oxiranylmethoxy-phenyl)-acryloylamino]-phenyl-acrylamide.

Preparative Example 3

Preparation of Monomer 3

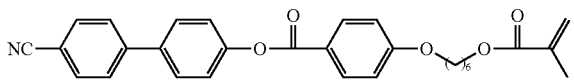

1.1 g of 4'-Hydroxybiphenyl-4-carbonitrile was dissolved in 10 mL of THF, and then 2.3 g of 4-[6-(tetrahydropyranyl-2-oxy)-hexyloxybenzoic acid, 140 mg of 1-hydroxybenzotriazole, and 1.4 g of 2-dimethylaminopropylcarbodiimide were added to the solution. The mixture was stirred at normal temperature for 5 hours, filtered to remove precipitates, distilled under reduced pressure, and then dissolved in a mixed solution of 20 mL of methanol and 20 mL of THF. Then, 100 mg of p-toluenesulfonic acid was added thereto, and the mixture was stirred at normal temperature for 10 hours. The resulting precipitate was collected with a filter, and the filtrate was washed with a large amount of methanol to obtain 1.2 g of a target compound. This target compound was dried, and dissolved in 10 mL of THF, and then 0.6 mL of methacrylic acid chloride was slowly added to the solution at 0° C. Then, the mixture was slowly warmed to normal temperature, and stirred for 3 hours. The precipitate was filtered off, and the precipitate was collected on the filter by addition of hexane, and then dried to obtain 0.7 g of a monomer 3 [4-[6-(2-methyl-acryloyloxy)-hexyloxy]-benzoic acid 4'-cyano-biphenyl-4-yl ester].

In the similar manner to the above-described process, the following monomers can be prepared:
1) 4-[6-(2-methyl-acryloyloxy)-hexyloxy]-benzoic acid 4'-methoxy-biphenyl-4-yl ester,
2) 4-[6-(acryloyloxy)-hexyloxy]-benzoic acid 4'-methoxy-biphenyl-4-yl ester,
3) 4-[6-(2-methyl-acryloyloxy)-methyloxy]-benzoic acid 4'-cyano-biphenyl-4-yl ester,
4) 4-[6-(2-methyl-acryloyloxy)]-benzoic acid 4'-cyano-biphenyl-4-yl ester,
5) 4-cyanobenzoic acid 4'-[6-(2-methyl-acryloyl)-hexyloxy]-biphenyl-4-yl ester,
6) 4-methoxybenzoic acid 4'-[6-(2-methyl-acryloyl)-hexyloxy]-biphenyl-4-yl ester,
7) 4-methoxybenzoic acid 4'-[6-(2-methyl-acryloyl)-ethyloxy]-biphenyl-4-yl ester,
8) 4-[6-(2-methyl-acryloyloxy)-hexyloxy]-benzoic acid 4'-methoxy-phenyl-4-yl ester, and
9) 4-methoxybenzoic acid 4'-[6-(2-methyl-acryloyl)-ethyloxy]-phenyl-4-yl ester.

Preparative Example 4

Preparation of Monomer 4

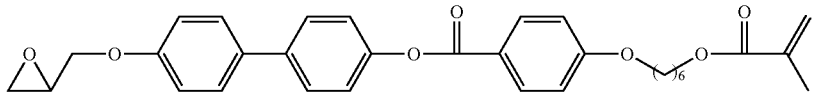

1.1 g of 4'-Allyloxymethyl-biphenyl-4-ol was dissolved in 10 mL of THF, and then 2.3 g of 4-[6-(tetrahydropyranyl-2-oxy)-hexyloxybenzoic acid, 140 mg of 1-hydroxybenzotriazole, and 1.4 g of 2-dimethylaminopropylcarbodiimide were added to the solution. The mixture was stirred at normal temperature for 5 hours, filtered to remove precipitates, distilled under reduced pressure, and then dissolved in a mixed solution of 20 mL of methanol and 20 mL of THF. Then, 100 mg of p-toluenesulfonic acid was added thereto, and the mixture was stirred at normal temperature for 10 hours. The resulting precipitate was collected with a filter, and the filtrate was washed with a large amount of methanol to obtain 1.2 g of a target compound. This target compound was dried, and dissolved in 10 mL of THF, and then 0.6 mL of methacrylic acid chloride was slowly added to the solution at 0° C. Then, the mixture was slowly warmed to normal temperature, and stirred for 3 hours. The precipitate was filtered off, and the precipitate was collected on the filter by addition of hexane, dried, and dissolved in 10 mL of THF, and then 1.2 g of 4-chloroperoxybenzoic acid (MCPBA) was added to the solution. The mixture was stirred at normal temperature for 12 hours. After reaction, 100 mL of distilled water was added to the mixture, and the resulting precipitate was collected with a filter, and then dried to obtain 1.3 g of a monomer 4 [4-[6-(2-methyl-acryloyloxy)-hexyloxy]-benzoic acid 4'-oxiranylmethoxy-biphenyl-4-yl ester].

In the similar manner to the above-described process, the following monomers can be prepared:
1) 4-[6-(2-methyl-acryloyloxy)-hexyloxy]-benzoic acid 4'-oxiranylmethoxy-biphenyl-4-yl ester,
2) 4-[6-(acryloyloxy)-hexyloxy]-benzoic acid 4'-oxiranylmethoxy-biphenyl-4-yl ester,
3) 4-oxiranylmethoxybenzoic acid 4'-[6-(2-methyl-acryloyl)-hexyloxy]-biphenyl-4-yl ester,
4) 4-oxiranylmethoxybenzoic acid 4'-[6-(2-methyl-acryloyl)-ethyloxy]-biphenyl-4-yl ester,
5) 4-[6-(2-methyl-acryloyloxy)-hexyloxy]-benzoic acid 4'-oxiranylmethoxy-phenyl-4-yl ester, and
6) 4-oxiranylmethoxybenzoic acid 4'-[6-(2-methyl-acryloyl)-ethyloxy]-phenyl-4-yl ester.

Preparative Example 5

Preparation of Monomer 5

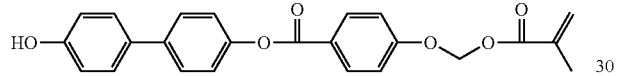

1.3 g of 4'-acetoxymethyl-biphenyl-4-ol was dissolved in 10 mL of THF, and then 2.3 g of 4-[6-(tetrahydropyranyl-2-oxy)-hexyloxybenzoic acid, 140 mg of 1-hydroxybenzotriazole, and 1.4 g of 2-dimethylaminopropylcarbodiimide were added to the solution. The mixture was stirred at normal temperature for 5 hours, filtered to remove precipitates, distilled under reduced pressure, and then dissolved in a mixed solution of 20 mL of methanol and 20 mL of THF. Then, 100 mg of p-toluenesulfonic acid was added thereto, and the mixture was stirred at normal temperature for 10 hours. The resulting precipitate was collected with a filter, and the filtrate was washed with a large amount of methanol to obtain 1.2 g of a target compound. This target compound was dried, and dissolved in 10 mL of THF, and then 0.6 mL of methacrylic acid chloride was slowly added to the solution at 0° C. Then, the mixture was slowly warmed to normal temperature, and stirred for 3 hours. The precipitate was filtered off, and the precipitate was collected on the filter by addition of hexane, dried, and dissolved in 10 mL of THF. Then, 0.9 g of potassium hydrogen carbonate was added thereto, and the mixture was stirred at normal temperature for 24 hours. After reaction, 100 mL of distilled water was added to the mixture, and the resulting precipitate was collected with a filter, and then dried to obtain 1.2 g of a monomer 5 [4-[6-(2-methyl-acryloyloxy)-hexyloxy]-benzoic acid 4'-hydroxy-biphenyl-4-yl ester].

In the similar manner to the above-described process, the following monomers can be prepared:
1) 4-[6-(2-methyl-acryloyloxy)-hexyloxy]-benzoic acid 4'-hydroxy-biphenyl-4-yl ester,
2) 4-[6-(acryloyloxy)-hexyloxy]-benzoic acid 4'-hydroxy-biphenyl-4-yl ester,
3) 4-hydroxybenzoic acid 4'-[6-(2-methyl-acryloyl)-hexyloxy]-biphenyl-4-yl ester,
4) 4-hydroxybenzoic acid 4'-[6-(2-methyl-acryloyl)-ethyloxy]-biphenyl-4-yl ester,
5) 4-[6-(2-methyl-acryloyloxy)-hexyloxy]-benzoic acid 4'-hydroxy-phenyl-4-yl ester, and
6) 4-hydroxybenzoic acid 4'-[6-(2-methyl-acryloyl)-ethyloxy]-phenyl-4-yl ester.

Example 1

1. Preparation of Polymer 1

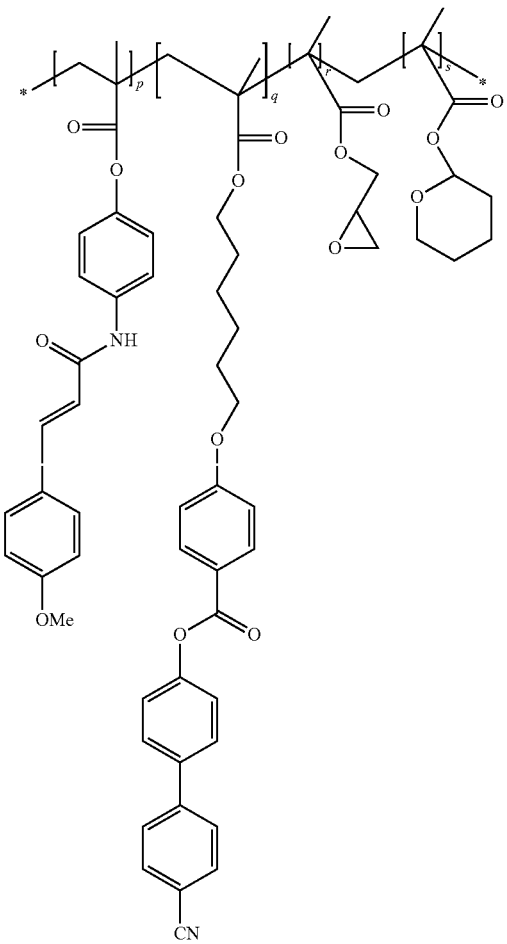

(p:q:r:s=1:1:0.2:0.02)

1.97 g of the monomer 1 [2-methacrylic acid-4-(3-(4-methoxy-phenyl)-acryloylamino)-phenylester] as prepared in Preparative Example 1, 2.82 g of the monomer 3 [4-[6-(2-methyl-acryloyloxy)-hexyloxy]-benzoic acid 4'-cyano-biphenyl-4-yl ester] as prepared in Preparative Example 3, 0.17 g of glycidyl methacrylate, and 0.04 g of tetrahydropyranyl methacrylate were dissolved in 22 mL of DMF. The solution was heated to 60° C. under nitrogen, and a solution obtained by dissolving 0.15 g of 2,2'-azobis(2,4-dimethylvaleronitrile) (V65) in 3 mL of DMF was added thereto to initiate the reaction. The reaction of the mixture was performed for 6 hours, and then the reaction was cooled to normal temperature. Then, the reaction solution was slowly added to 1 L of ethanol for precipitation. The precipitate was dissolved in DMF (7 mL, per g of thus obtained white solid), and then heated to 60° C. Ethanol was slowly added to the solution (about 8 mL of ethanol per g of the white solid) for precipitation again, and the resultant was dried to obtain a polymer 1 (3.75 g).

2. Production of a Liquid Crystal Alignment Solution

The polymer 1 (100 mg) that was produced in item 1 was dissolved in 5 mL of a cyclopentanone (CP) solvent, and passed through a filter having a hole size of 0.45 μm to remove floating materials.

3. Production of a Liquid Crystal Cell

The liquid crystal alignment solution that was produced in item 2 was applied on an ITO substrate to a thickness of 800 Å at a rate of 4,500 rpm for 25 sec using spin coating. The substrate on which the liquid crystal alignment solution was applied was heated at 150° C. for 10 min to vaporize the solvent. The substrate on which the aligning layer was applied was exposed to polarized ultraviolet rays in the intensity of 20 mW/cm$^2$ using a high pressure mercury lamp for 10 sec (200 mJ), 50 sec (1 J), and 250 sec (5 J). After the exposing, the substrate on which the aligning layer was applied was subjected to the heat treatment for 45 min, in detail, at 100° C. for 15 min, at 140° C. for 15 min, and at 180° C. for 15 min. An electrically controlled birefringence (ECB) type of liquid crystal cell having an interval of 60 mm was produced using the exposed and heat treated substrate by means of a double-sided adhesive tape. The IPS (In-Plane-Switching) type of liquid crystal was injected into the produced electrically controlled birefringence (ECB) type of liquid crystal cell using a capillary tube to complete the production of the electrically controlled birefringence type of liquid crystal cell. The produced liquid crystal cell was subjected to the heat treatment at 100° C. for 2 min.

Example 2

1. Production of Polymer 2

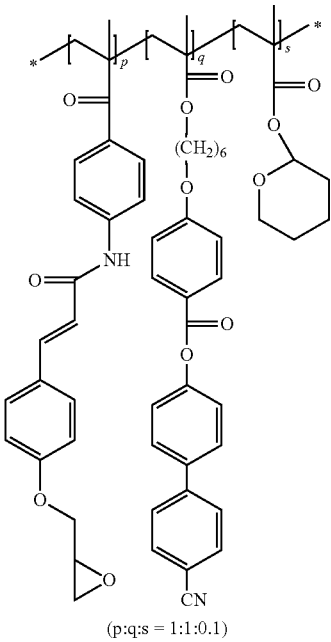

(p:q:s = 1:1:0.1)

The production procedure of the polymer 1 of Example 1 was repeated to produce the polymer 2 (4.1 g), except that 2.02 g of 2[2-methyl-acrylic acid 4-[3-(4-oxiranylmethoxy-phenyl)-acryloylamino]-phenylester] which was the monomer produced in Preparation example 2, 2.89 g of 3[4-[6-(2-methyl-acryloyloxy)-hexyloxy]-benzoic acid 4'-cyano-biphenyl-4-ayl ester] which was the monomer produced in Preparation example 3, and 0.09 g of tetrahydropyranyl methacrylate were used.

2. Production of a Liquid Crystal Alignment Solution

The liquid crystal alignment solution was produced through the same procedure as item 2 of Example 1, except that the polymer 2 (99 mg) and 2-phenylimidazole (0.1 mg) were used instead of the polymer 1 of Example 1.

3. Production of a Liquid Crystal Cell

The liquid crystal cell was produced through the same procedure as item 3 of Example 1 using the liquid crystal alignment solution produced in item 2.

Example 3

1. Production of Polymer 3

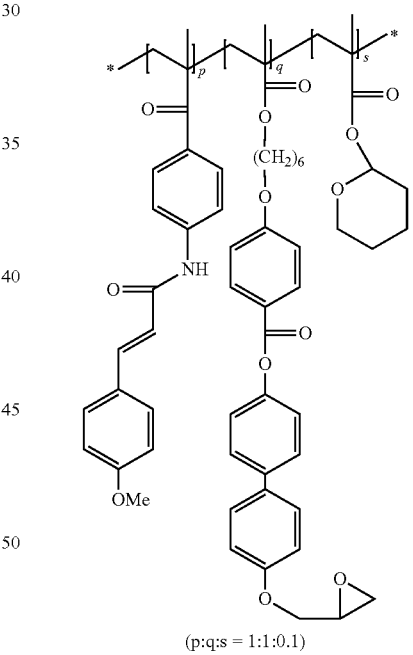

(p:q:s = 1:1:0.1)

The production procedure of the polymer 1 of Example 1 was repeated to produce the polymer 3 (4.1 g), except that 2.02 g of 1[2-methacrylic acid-4-(3-(4-methoxy-phenyl)-acryloylamino)-phenylester] which was the monomer produced in Preparation example 1, 2.89 g of 4[4-[6-(2-methyl-acryloyloxy)-hexyloxy]-benzoic acid 4'-oxiranylmethoxy-biphenyl-4-ayl ester] which was the monomer produced in Preparation example 4, and 0.09 g of tetrahydropyranyl methacrylate were used.

2. Production of a Liquid Crystal Alignment Solution

The liquid crystal alignment solution was produced through the same procedure as item 2 of Example 1, except that the polymer 3 (99 mg) and 2-phenylimidazole (0.1 mg) were used instead of the polymer 1 of Example 1.

3. Production of a Liquid Crystal Cell

The liquid crystal cell was produced through the same procedure as item 3 of Example 1 using the liquid crystal alignment solution produced in item 2.

Example 4

1. Production of Polymer 4

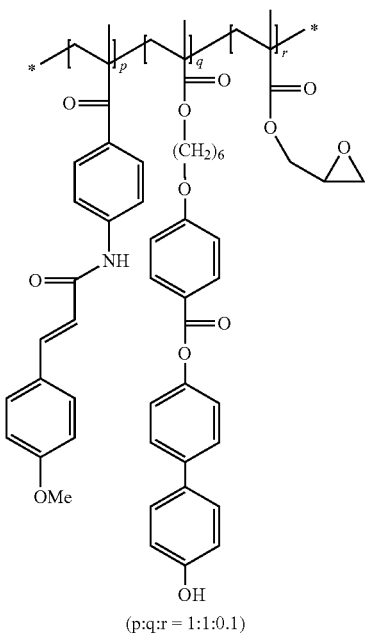

(p:q:r = 1:1:0.1)

The production procedure of the polymer 1 of Example 1 was repeated to produce the polymer 5 (3.7 g), except that 1.98 g of 1[2-methacrylic acid-4-(3-(4-methoxy-phenyl)-acryloylamino)-phenylester] which was the monomer produced in Preparation example 1, 2.24 g of 5[4-[6-(2-methyl-acryloyloxy)-hexyloxy]-benzoic acid 4'-hydroxy-biphenyl-4-ayl ester] which was the monomer produced in Preparation example 5, and 0.12 g of glycidyl methacrylate were used.

2. Production of a Liquid Crystal Alignment Solution

The liquid crystal alignment solution was produced through the same procedure as item 2 of Example 1, except that the polymer 5 (99 mg) was used instead of the polymer 1 of Example 1.

3. Production of a Liquid Crystal Cell

The liquid crystal cell was produced through the same procedure as item 3 of Example 1 using the liquid crystal alignment solution produced in item 2.

Comparative Example 1

1. Production of Comparative Polymer 1

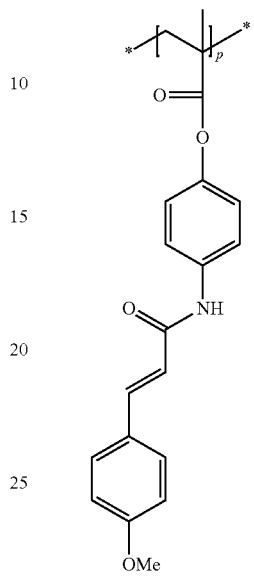

1.5 g of 1 [2-methacrylic acid-4-(3-(4-methoxy-phenyl)-acryloylamino)-phenylester] which was the monomer produced in Preparation example 1 was dissolved in 9 mL of DMF. After the solution was heated to 60° C. in nitrogen, 45 mg of 2,2'-azobis(2,4-dimethylvaleronitrile) (V65) that was dissolved in 1 mL of DMF was added to the solution to initiate a reaction. After the reaction was performed for 6 hours, cooling was performed to normal temperature, and the reaction solution was slowly added to 600 mL of ethanol to perform precipitation. The obtained white solid was dissolved in DMF at the ratio of about 7 mL of DMF per 1 g of solid and heated to 60° C. Next, ethanol was slowly added to the resulting solution at the ratio of about 8 mL of ethanol per 1 g of solid to perform additional precipitation, thus producing the comparative polymer 1 (0.75 g) that was the white solid.

2. Production of a Liquid Crystal Alignment Solution

The liquid crystal alignment solution was produced through the same procedure as item 2 of Example 1, except that the comparative polymer 1 (99 mg), methyltetrahydro phthalic anhydride (1 mg), and 2-phenylimidazole (0.1 mg) were used instead of the polymer 1 of Example 1.

3. Production of a Liquid Crystal Cell

The liquid crystal cell was produced through the same procedure as item 3 of Example 1 using the liquid crystal alignment solution produced in item 2, except that the substrate on which the aligning layer was applied was not subjected to the heat treatment after the exposing.

Comparative Example 2

1. Production of Comparative Polymer 2

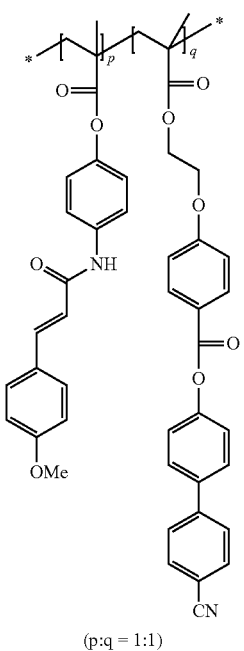

(p:q = 1:1)

4.7 g of 1 [2-methacrylic acid-4-(3-(4-methoxy-phenyl)-acryloylamino)-phenylester] which was the monomer produced in Preparation example 1, and 6.8 g of 3[4-[6-(2-methyl-acryloyloxy)-hexyloxy]-benzoic acid 4'-cyano-biphenyl-4-ayl ester] which was the monomer produced in Preparation example 3 were dissolved in 55 mL of DMF. After the solution was heated to 60° C. in nitrogen, 0.345 g of 2,2'-azobis(2,4-dimethylvaleronitrile) (V65) that was dissolved in 2.5 mL of DMF was added to the solution to initiate a reaction. After the reaction was performed for 6 hours, cooling was performed to normal temperature, and the reaction solution was slowly added to 1 L of ethanol to perform precipitation. The obtained white solid was dissolved in DMF at the ratio of about 7 mL of DMF per 1 g of solid and heated to 60° C. Next, ethanol was slowly added to the resulting solution at the ratio of about 8 mL of ethanol per 1 g of solid to perform additional precipitation and the resulting substance was dried, thus producing the comparative polymer 2 (10 g).

2. Production of a Liquid Crystal Alignment Solution

The liquid crystal alignment solution was produced through the same procedure as item 2 of Example 1, except that the comparative polymer 2 (100 mg) was used instead of the polymer 1 of Example 1.

3. Production of a Liquid Crystal Cell

The liquid crystal cell was produced through the same procedure as item 3 of Example 1 using the liquid crystal alignment solution produced in item 2, except that the substrate on which the aligning layer was applied was not subjected to the heat treatment after the exposing.

Experimental Example 1

Evaluation of Initial Alignment of the Liquid Crystal Cell According to the Present Invention Initial alignment of the liquid crystal cells that were produced using the copolymer for liquid crystal alignment according to the present invention was evaluated using the following experiment.

The liquid crystal cells that were produced in Examples 1 to 4 and Comparative examples 1 and 2 were put on a light box having a polarizing plate attached thereto, and another polarizing plate was put on the resulting box so that the two polarizing plates intersect to observe the liquid crystal alignment of the aligning layer. The liquid crystal alignment was evaluated using the traces of the flowing liquid crystals and light leakage.

The evaluation standards of the alignment of the liquid crystal cell are shown in FIG. 1, and the results are described in Table 1.

TABLE 1

| Aligning layer | Exposure for 10 sec | Exposure for 50 sec | Exposure for 250 sec |
| --- | --- | --- | --- |
| Example 1 | excellent | excellent | good |
| Example 2 | excellent | excellent | good |
| Example 3 | excellent | excellent | good |
| Example 4 | excellent | excellent | good |
| Comparative example 1 | acceptable | acceptable | very poor |
| Comparative example 2 | good | good | good |

As shown in Table 1, the liquid crystal cells that were produced using the copolymer for liquid crystal alignment according to the present invention (Examples 1 to 4) had no defects but the good alignment when the cells were observed with the naked eye. Furthermore, in the cases of Comparative examples 1 and 2, the initial alignment was acceptable.

Experimental Example 2

Evaluation of Thermal Stability of the Liquid Crystal Cell According to the Present Invention Thermal stability of the liquid crystal cells that were produced using the copolymer for liquid crystal alignment according to the present invention was evaluated using the following experiment.

After spin coating was performed during the production of the liquid crystal cells according to Examples 1 to 4 and Comparative examples 1 and 2, the exposing and the heat treatment were performed, and the single substrate was heat treated at 170° C. for 30 min to produce the liquid crystal cell. The thermal stability of the single substrate was evaluated using the alignment of the liquid crystal.

The results are described in Table 2.

TABLE 2

| Aligning layer | Exposure for 10 sec | Exposure for 50 sec | Exposure for 250 sec |
| --- | --- | --- | --- |
| Example 1 | excellent | excellent | excellent |
| Example 2 | excellent | excellent | excellent |
| Example 3 | excellent | excellent | excellent |
| Example 4 | good | good | good |

TABLE 2-continued

| Aligning layer | Exposure for 10 sec | Exposure for 50 sec | Exposure for 250 sec |
|---|---|---|---|
| Comparative example 1 | poor | poor | very poor |
| Comparative example 2 | good | good | good |

As shown in Table 2, in the case of the liquid crystal cells that were produced using the copolymer for liquid crystal alignment according to the present invention (Examples 1 to 4), there was no change in alignment as a result of the evaluation of the thermal stability. However, in the case of Comparative example 1, the alignment was very poor as a result of the evaluation of the thermal stability.

Experimental Example 3

Evaluation of the Residual Image Characteristic of the Liquid Crystal Cell According to the Present Invention The residual image characteristic of the liquid crystal cells that were produced using the copolymer for liquid crystal alignment according to the present invention was evaluated using the following experiment.

Of the liquid crystal cells according to Examples 1 to 4 and Comparative examples 1 and 2, the cell that was exposed for 50 sec was short circuited for 1 min. Transmittance-voltage characteristic of the cell to the electromagnetic field (frequency of 1000 Hz and voltage of 0 to 5 V) was evaluated. The alternating current voltage (frequency of 1000 Hz and voltage of 5 V) was applied to the cell for 30 min. The above-mentioned procedure was repeated twice. The residual image coefficient was calculated using the following Equation 1.

$$S \text{ (residual image coefficient)} = T/T_{max} \quad \text{[Equation 1]}$$

※$T_{max}$: maximum value of the transmittance in the first transmittance-voltage graph T: difference in maximum value of the first transmittance (T1-max) and the second transmittance (T2-max) in the transmittance-voltage graph The measured residual image coefficients are described in Table 3.

TABLE 3

| Aligning layer | Residual image coefficient (S) |
|---|---|
| Example 1 | 0.01 |
| Example 2 | 0.01 |
| Example 3 | 0.02 |
| Example 4 | 0.02 |
| Comparative example 1 | 0.09 |
| Comparative example 2 | 0.08 |

As shown in Table 3, in the case of the liquid crystal cell that was produced using the copolymer for liquid crystal alignment according to the present invention, the residual image coefficient was low. Hence, in the case of the liquid crystal cell according to the present invention (Examples 1 to 4), a change in initial luminance was low and the time required to restore the luminance to the initial luminance was very short.

Experimental Example 4

Evaluation of the Second Residual Image Characteristic of the Liquid Crystal Cell According to the Present Invention The second residual image characteristic of the liquid crystal cells that were produced using the copolymer for liquid crystal alignment according to the present invention was evaluated using the following experiment.

After an alternating current voltage of 7 V was applied to the cell that was exposed for 50 sec among the liquid crystal cells according to Examples 1 to 4 and Comparative examples 1 and 2 for 6 hours, a change in blackness (black luminance) was measured while the voltage was blocked to perform the evaluation.

The results are shown in FIG. 2.

From FIG. 2, it can be seen that in the case of the liquid crystal cells (Examples 1 to 4) that were produced using the copolymer for liquid crystal alignment according to the present invention, the change in blackness was small and the time required to restore the luminance to the initial luminance was very short after voltage was applied under a severe condition.

The invention claimed is:

1. A copolymer for liquid crystal alignment shown in Formula 1:

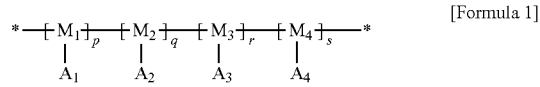

[Formula 1]

wherein $M_1$ to $M_4$ are respectively independent repeating units in a polymer chain, and selected from the group consisting of an acryl group, a methacryl group, a croton group, a maleic group, a maleamic group, a citracon group, an itacon group, a styrene group, a methyl styrene group, an acrylamide group, a methacrylamide group, and a maleic imide group, wherein, p, q, r, and s are molar ratios of the repeating units, p+q+r+s are 1, p is 0.1 to 0.9, q is 0.1 to 0.9, r is 0 to 0.3, and s is 0 to 0.3, wherein, $A_1$ contains any one selected from the group consisting of the following structural formulae:

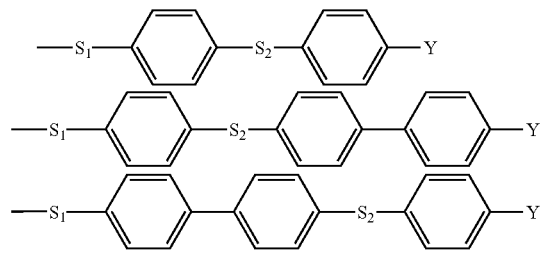

in the structural formulae, $S_1$ is a divalent functional group of —O—, —NH—, or $C_1$ to $C_6$ alkyl chains, the $C_1$ to $C_6$ alkyl chains being substituted on both ends thereof with identical or different functional group selected from the group consisting of an ether group, an amine group, an ester group, and an amide group, $S_2$ is a group having an enone structure that is capable of being photodimerized and isomerized, and is —NH—CO—(CH=CH)—, —O—CO—(CH=CH)—, —(CH=CH)—CO—NH—, —(CH=CH)—CO—O—, —CO—(CH=CH)—, or —(CH=CH)—CO—, and Y is a ligand selected from the group consisting of a hydrogen, a hydroxy group, a $C_1$ to $C_{10}$alkyloxy group, a halogen, an amine group, a nitrile group, a nitro group, a glycidyl group, an isocyanate group, a tetrahydropyranyl carboxylic acid group, and an acetic anhydride group;

$A_2$ contains any one selected from the group consisting of the following structural formulae:

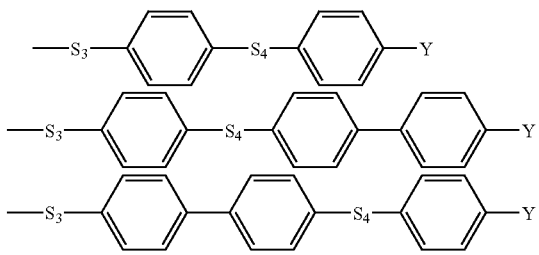

in the structural formulae, $S_3$ is a divalent functional group of —O—, —NH—, or $C_1$ to $C_6$ alkyl chains, the $C_1$ to $C_6$ alkyl chains being substituted on both ends thereof with identical or different functional groups selected from the group consisting of an ether group, an amine group, an ester group, and an amide group, $S_4$ is —CO—O— or —O—CO—, and Y is a ligand selected from the group consisting of a hydrogen, a hydroxy group, a $C_1$ to $C_{10}$ alkyloxy group, a halogen, an amine group, a nitrile group, a nitro group, a glycidyl group, an isocyanate group, a tetrahydropyranyl carboxylic acid group, and an acetic anhydride group;

$A_3$ is represented by the following structural formula:

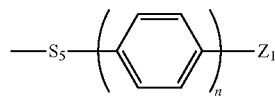

in the structural formula, $S_5$ is a divalent functional group of —O—, or $C_1$ to $C_{10}$ alkyl chains, the $C_1$ to $C_{10}$ alkyl chains being substituted on both ends thereof with an ether group or a —OCO—NH— group, n is 0 or 1, and $Z_1$ is a group which causes thermal curing and is selected from the group consisting of an epoxy group, an oxetane group, an isocyanate group, an isothiocyanate group, a hydroxy group, and an amine group; and $A_4$ is represented by the following structural formula:

in the structural formula, $S_6$ is a divalent functional group of —O—, or $C_1$ to $C_4$ alkyl chains, the $C_1$ to $C_4$ alkyl being substituted on both ends thereof with an ether group, and $Z_2$ is a functional group which causes crosslinking and is selected from the group consisting of a carboxylic acid group, a tetrahydropyran group, an acid anhydride group, and an imidazole group.

2. The copolymer for liquid crystal alignment according to claim 1,
wherein $S_1$ is —O—, —NH—, or —NH—$(CH_2)_n$—NH—, —O—$(CH_2)_n$—O—, —NH—$(CH_2)_n$—O—, —O—$(CH_2)_n$—NH—, —O—$(CH_2)_n$OCO—, or —O—$(CH_2)_n$—NHCO—, and n is 1 to 6.

3. The copolymer for liquid crystal alignment according to claim 1,
wherein a monomer for the $M_1$-$A_1$ repeating unit contains the structural formula selected from the group consisting of the following structural formulae:

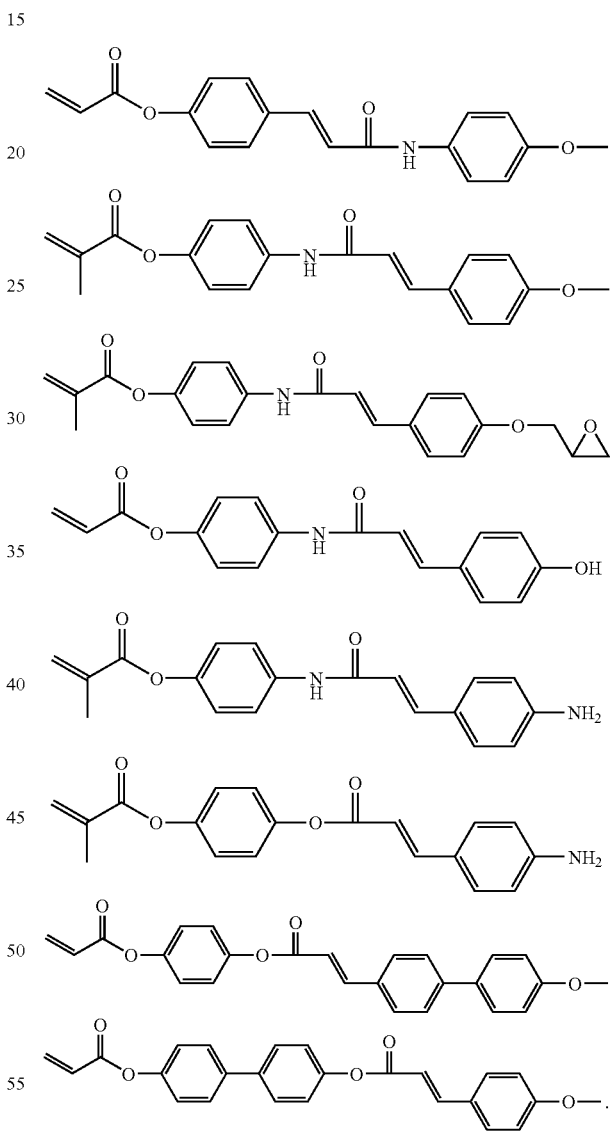

4. The copolymer for liquid crystal alignment according to claim 1, wherein $S_3$ is —O—, —NH—, or —NH—$(CH_2)_n$—NH—, —O—$(CH_2)_n$—O—, —NH—$(CH_2)_n$—O—, —O—$(CH_2)_n$—NH—, —O—$(CH_2)_n$OCO—, or —O—$(CH_2)_n$—NHCO—, and n is 1 to 12.

5. The copolymer for liquid crystal alignment according to claim 1, wherein a monomer for the $M_2$-$A_2$ repeating unit contains the structural formula selected from the group consisting of the following structural formulae:

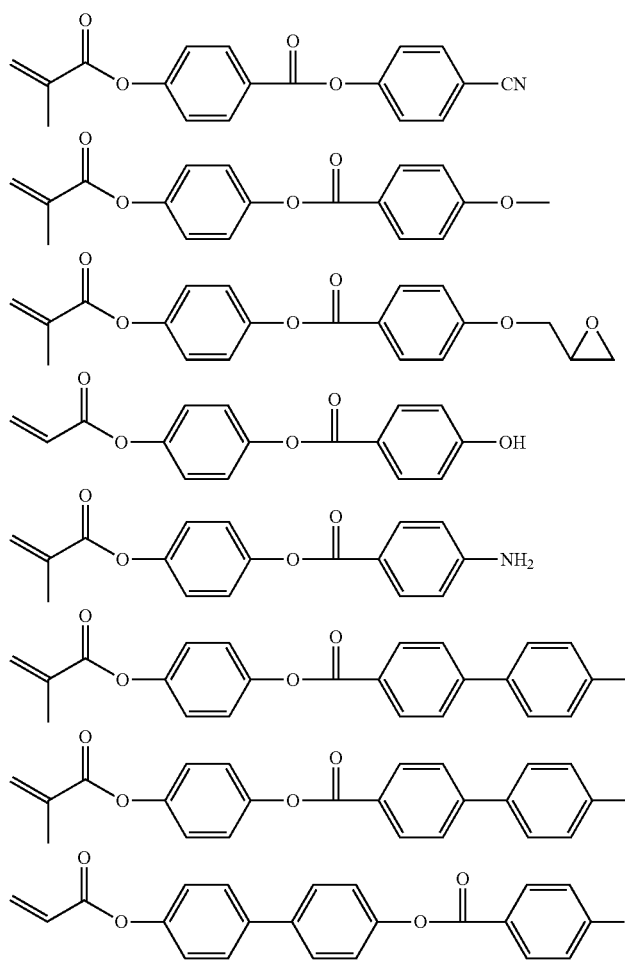
6. The copolymer for liquid crystal alignment of claim 1, wherein a monomer for the $M_3$-$A_3$ repeating unit contains the structural formula selected from group consisting of the following structural formulae:
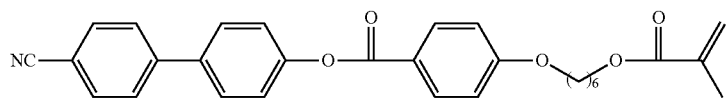
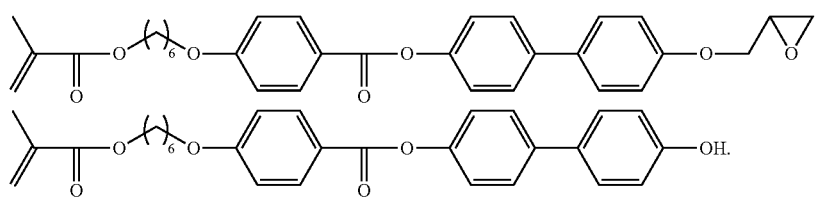
-continued
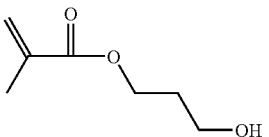
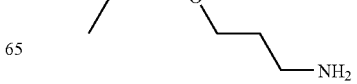

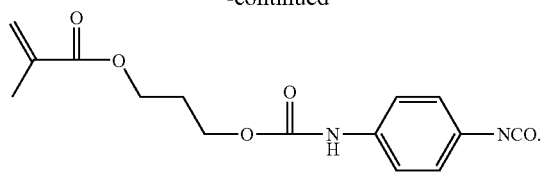

7. The copolymer for liquid crystal alignment of claim 1, wherein a monomer for the $M_4$-$A_4$ repeating unit contains the structural formula selected from the group consisting of the following structural formulae:

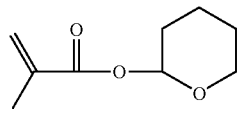

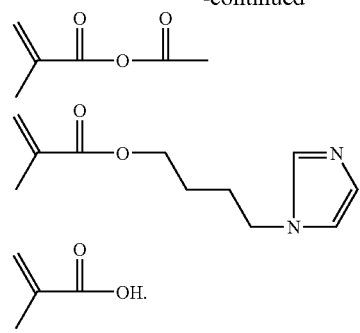

8. A liquid crystal aligning layer comprising the copolymer for liquid crystal alignment according to claim 1.

9. A liquid crystal display comprising the liquid crystal aligning layer of claim 8.

* * * * *